Feb. 8, 1966 L. L. STRYDOM 3,233,679
ROTATING WING AIRCRAFT
Filed Nov. 19, 1963 2 Sheets-Sheet 1

Llewellyn Louis Strydom,
INVENTOR.

BY Wenderoth, Lind
and Ponack,
Attorneys

United States Patent Office 3,233,679
Patented Feb. 8, 1966

3,233,679
ROTATING WING AIRCRAFT
Llewellyn Louis Strydom, Worcester, Cape Province, Republic of South Africa, assignor to Rotorcraft S.A. (Proprietary) Limited
Filed Nov. 19, 1963, Ser. No. 324,681
Claims priority, application Republic of South Africa, Nov. 24, 1962, 62/4,938
14 Claims. (Cl. 170—160.27)

The present invention relates to improvements in rotating wing aircraft, in particular to the autogyro type or aircraft capable of flying in autogyro fashion. The invention relates in particular to improvements in the rotor-mounting of such craft, particularly to means associated with the mechanism for cyclic pitch change in a semi-rigid see-saw rotor.

In aircraft of the autogyro type or capable of flying in autogyro fashion, considerable drag forces are exercised on the rotor of the craft while the craft is in flight or taxiing at high speed. In conventional rotating wing aircraft, these drag forces tend to tilt the axis of rotation of the rotor backwards, a tendency which has to be compensated for manually by the pilot by means of a joystick or similar control, which may be extremely tiresome, particularly at high speeds when the drag forces increase.

It is an object of the invention to provide automatic compensation for the drag effect of rotors in such aircraft.

According to the invention, a rotary wing aircraft rotor mounting means includes a hinge joint for suspending the air frame of the aircraft hingedly below the rotor and in advance of the axis of rotation of the rotor.

The rotor mounting means may include an axle having a rotor connection for connection to the rotor of the aircraft, and a holder rotatably supporting the axle. The hinge joint may include a universal-type joint to permit tilting of the axis of rotation of the rotor, in all directions relative to the air frame.

The rotor mounting means may include a main support arm projecting forwardly from the holder transversely to the axis of the axle; and the hinge joint may include a bracket mounted on the main support arm to pivot about the axis of the arm, and hinge means having connecting means for hinged connection to the air frame about an axis disposed transversely to the axis of the main support arm. The axis of the hinge means of the universal-type joint is conveniently disposed not higher than the axis of the main support arm.

The holder may include at least one pitch control arm, and a connection connecting the pitch control arm to the aircraft control stick or the equivalent, whereby the axis of the rotor axle may be tilted about the hinge joint. Alternatively, the holder may include two pitch control arms projecting rearwardly in V-fashion, and there may be provided depending pivotal connections having their lower ends connected to the aircraft control stick or the equivalent, whereby the axis of the rotor axle may be tilted about the hinge joint, the aircraft control stick or the equivalent being mounted to be pivotally displaced about a longitudinal axis disposed between the depending pivotal connection, and also to be pivotally displaceable about a transverse axis.

Bias means may be provided for urging the holder pivotally rearwardly about the hinge joint, relative to the air frame. If desired, adjustment means may be provided for adjusting the stiffness of the bias means. The bias means may be spring means connected to the air frame, and to the holder, and the adjustment means may include screw means and a cable for operating the screw means. The bias means is adapted to compensate for reduced drag of the rotor at slow speeds, and during descent. The stiffness of the bias means, i.e., the amount of compensation, may be adjustable, conveniently from the pilot's seat. The spring means may include an adjustable spring, connected to each of the rearwardly connecting arms from the holder, the springs having a tendency to level out the position of the rotor. Adjustment screws for adjusting the amount of spring-loading, are conveniently provided, and are conveniently operable by means of cables from the pilot's seat.

The ratio of the height of the rotor connection above the hinge joint to the distance by which the hinge joint is in advance of the axis of rotation of the rotor, falls conveniently within the range 1 to 7. This ratio may be made adjustable to suit varying conditions, by having adjustment means to adjust the distance by which the hinge joint is in advance of the axis of rotation of the rotor. Alternatively, or in addition, the ratio may also be adjusted by means of further adjustment means, for adjusting the height of the rotor connection on the axle relative to the level of the hinge joint.

The distance by which the hinge joint is in advance of the axis of rotation of the rotor, is conveniently made such that the lifting forces exercised by the rotor in operation, compensate for at least a material part of the drag forces which tend to tilt the rotor backwards.

The scope of the invention is also intended to embrace a rotary wing aircraft of the type described, and in which the features described above are incorporated. In such aircraft, the amount by which the hinge joint is in advance of the axis of rotation of the rotor, is determined to provide for the best drag compensation at the approximate optimum cruising speed of the aircraft. An aircraft of this type may include a semi-rigid see-saw-type rotor adapted for cyclic pitch change by tilting of the rotor axle.

The invention and the manner in which it may be put into practice, will be further described by way of example with reference to the accompanying drawings.

Figure 1:
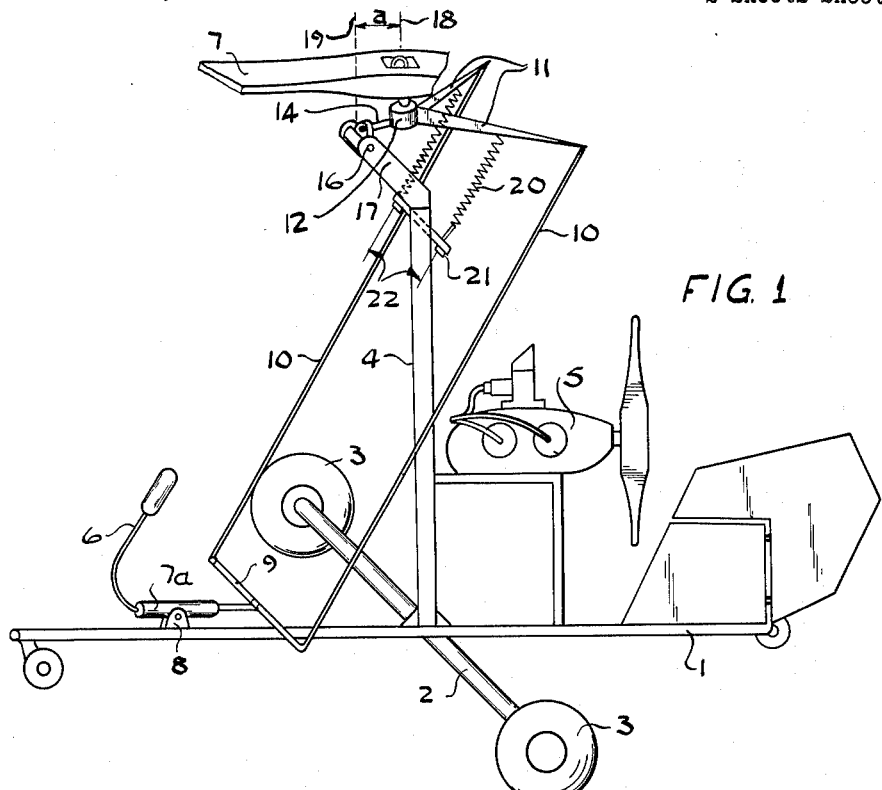
FIGURE 1 represents a diagrammatic perspective view of an autogyro incorporating the features of the invention.
Figure 3:
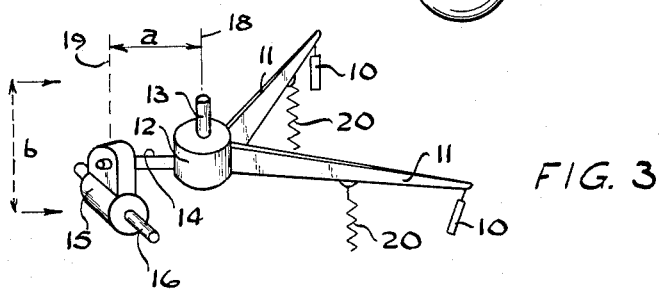
FIGURE 3 represents a perspective detailed view of the means for mounting the rotor.

Referring to FIGURES 1 and 3 of the drawings, the airframe of the autogyro illustrated comprises a keel 1, an axle 2 transverse thereto for the main wheels 3 of the under-carriage, and a mast 4 mounted on the keel. Behind the mast the engine 5 with pusher-type propeller is mounted. The pilot seat is in front of the mast and has been omitted from the drawing for the sake of clarity. It is in such a position that the handle of the joystick 6 is easily accessible. The joystick 6 serves for the cyclic pitch change and control of the semi-rigid see-saw-type rotor 7, the mounting of which will be described in more detail further below. Generally speaking, the joystick 6 is firstly hinged at 7 about a longitudinal axis so that it can be tilted sideways right and left in order to bring about lateral tilting of the rotor for the purpose of rolling control. It is furthermore hinged at 8 about a transverse axis for forward and backward tilting of the joystick in order to induce pitching. As is shown in FIGURE 1 the lower part of joystick 6 is bent backwards and is rigidly connected at its rear end to a cross bracket 9 to the right and left-hand ends of which connecting rods 10 are movably connected, the upper ends of which are similarly movably connected to two pitch control arms 11 rigidly connected to a holder 12, for tilting the rotor axle 13. As shown in the drawing, the arms 11 extend rearwards and sideways in V-shaped relationship from the holder 12, which latter is positioned in the apex of the V.

Opposite the apex of the lever arms 11, a main support arm 14 extends from the rotor axle holder 12 in a forward direction. The forward end of arm 14 passes in an axially rotatable manner through a bracket 15 in which it is constrained against forward or rearward sliding movement by means not shown. A pin 16 passes through the bracket 15 in a horizontal direction normal to the axis of arm 14, and ends of pin 16 are mounted in the fork of a mounting bracket 17 at the upper end of mast 4. Pin 16 is in pivotal relationship to either the mounting bracket 17 or the bracket 15 or both, accordingly the bracket 15 and associated means perform the function of a universal joint.

The axis of rotation of the rotor is indicated by dash-dotted line 18. The hinge joint is constituted by the arm 14, bracket 15 and pin 16. The axis 18 of the rotor axle 13 is therefore tiltable about the axis of support arm 14 and about the axis of pin 16. A vertical line through the axis of the arm 14 and through the axis of the pin 16 is indicated by dotted line 19. This line 19 is in advance of line 18 by a horizontal distance $a$ whereas the level of the effective centre of attack of the drag forces on the rotor above the hinge point may be represented by vertical distance $b$, being the vertical distance between the axis of pin 16 and the rotor connection between the rotor and the rotor axle. (See FIG. 3.)

The lift and drag co-efficients are known quantities for any given rotor. This being so, the optimum distance $a$ for a given rotor and aircraft combination at a particular cruising speed can easily be determined, as diagrammatically indicated in FIGURE 2, when distance $b$ is known.

Figure 2:
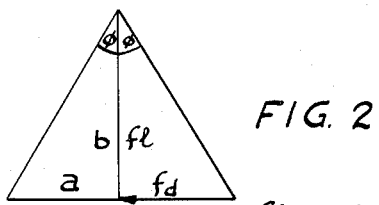
FIGURE 2 represents a geometrical diagram to illustrate the basic principle underlying the invention.

Referring to FIGURE 2, the vectors of the lift and drag forces acting on the rotor and which are normal to one another in level flight, have been indicated by $fl$ and $fd$ respectively. The vectors have been drawn on such a scale that $fl$ equals $b$. This being so, it follows that distance $a$ must be equal in length to $fd$.

Perfect compensation of the effect of the drag forces in the manner just described can only be attained for a particular predetermined speed, since drag forces do not normally change in exactly the same ratio as lift forces with a change in speed. Referring now again to FIGURES 1 and 3, compensating springs 20 are provided for additional compensation, and can in addition, be used to effect some lateral trimming as well, by unequal tensions in springs. The spring-loading provided by the springs may be increased or decreased at will by means of adjusting screws 21. These adjusting screws may be operable by means of Bowden cables 22 to make the adjustment more convenient for the pilot.

Figure 4:
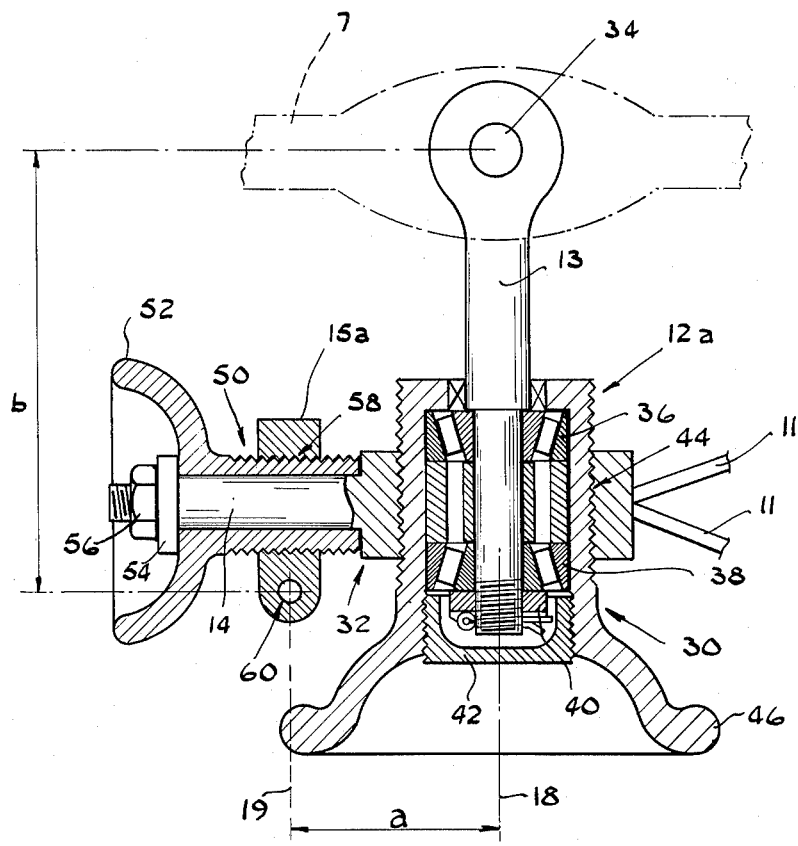
FIGURE 4 shows an axial section through adjustable rotor mounting means in accordance with the invention.

Compensation may be provided by alternative means, for example by providing for adjustment in the length of the distance $a$ or in the length of the distance $b$ or both. In this connection reference is made to FIGURE 4 of the drawings, in which adjustable rotor mounting means is shown having means for adjustment of both these distances.

Reference numeral 12a refers generally to the holder comprising broadly a bearing box 30, and a spider 32, having the pitch control arms 11 extending rearwardly V-fashion, and the main support arm 14 extending forwardly.

The rotor axle 13 is pivotally connected to the rotor 7 about the axis of pin 34 thereby providing the see-saw mounting of the rotor. The axle is rotatably mounted in and axially located in the bearing box 30 by means of taper thrust roller bearings 36 and 38 located in the bearing box 30 by nut 40 which is locked in position. The bearing cavity is covered by cover 42.

The spider 32 is provided with a female screw threaded bore 44 within which the bearing box can be screwed by means of handwheel 46.

An externally threaded sleeve 50 having a handwheel portion 52 is rotatably mounted on arm 14 and axially located in position on it by means of washer 54 and nut 56 locked in position. Bracket 15a is provided with internal threads 58 adapted to receive the threaded sleeve 50. The bracket 15a has also holes 60 adapted to receive pin 16 for connection to bracket 17.

Adjustment in the lengths of the distances $a$ and $b$ is obtained by rotating the handwheels 52 and 46 in the required direction.

It will be apparent that for small and light aircraft the adjustment may be made by handwheels operable from the pilot's seat. Adjustment may be made easy by making use of low friction screw threads. Suitable lock means may be provided for locking the handwheels in position once they have been set.

If desired, however, the sleeve 50 and the bearing box 30 may be provided with sprockets or toothed gear wheels and may be arranged for remote control via chains or gearing, and to provide a mechanical advantage.

The adjustment means shown is given by way of example only and other means may be devised to secure this adjustment, which provides compensation for varying flight conditions to balance the drag and lift forces on the control system.

In operation, when the rotor disc enters a gust both the lift and drag increase, but the lift increases proportionately more than the drag. This increased proportion of lift pulls the rotor axle upward thus resulting in a forward tilt of the rotor axle relative to the air frame about the axis of pins 16. Because cyclic pitch is controlled by tilting of the rotor axle, rotor disc incidence decreases thus decreasing lift and providing inherent stability.

During downdrafts or gusts from the rear the opposite takes place.

The construction in accordance with the invention therefore has an inherent stabilizing effect upon the aircraft in flight under variable atmospheric conditions.

I claim:

1. A rotary wing aircraft having a rotor and an airframe, and which includes a holder below the rotor and supporting the rotor rotatably about an upwardly directed axis, a universal joint connection below the rotor and in front of the rotor axis and connecting the air frame to the holder, and at least two resilient connections between the holder and the air frame and spaced laterally on either side of the longitudinal plane of the aircraft containing the rotor axis, the resilient connections urging downwardly relative to the air frame about the universal joint connection that part of the holder supporting the rotor, and thereby permitting free tilting of the rotor axis, subject only to the influence of the resilient connections, in all directions about the universal joint connection relative to the air frame.

2. A rotary wing aircraft according to claim 1 in which both resilient connections are behind the rotor axis and include tensile resilient elements.

3. A rotary wing aircraft according to claim 1 in which the resilient connections are equally spaced laterally on either side of the longitudinal plane of the aircraft containing the rotor axis.

4. A rotary wing aircraft according to claim 1 in which resilient connection adjustment means are provided for adjusting the initial stiffness of the resilient connections.

5. A rotary wing aircraft according to claim 1, in which the universal joint connection is in the form of a gimbal system comprising a bracket pivotally mounted on a main support arm fast with the holder and projecting forwardly from it to permit movement of the rotor axis in a rolling plane about the axis of the main support arm, and a pivotal connection connecting the bracket pivotally to the air frame about a pitch axis transverse to the axis of the main support arm.

6. A rotary wing aircraft according to claim 5, in which the pitch axis is arranged below the roll axis.

7. A rotary wing aircraft according to claim 5 in which the ratio of the height of the rotor wing above the pitch axis to the distance by which the pitch axis is in advance of the rotor axis falls within the range from 2:1 to 7:1.

8. A rotary wing aircraft as claimed in claim 1, in which the holder is provided with laterally spaced connections behind the rotor axis, and which includes control elements connected to the connections and depending downwardly, and control means connected to the lower ends of the control elements.

9. A rotary wing aircraft having a rotor and an air frame and which includes a holder below the rotor and supporting the rotor rotatably about an upwardly directed axis, the holder being provided with laterally spaced connections behind the rotor axis; a universal joint connection below the rotor and in front of the rotor axis and connecting the air frame to the holder; at least two resilient connections between the holder and the air frame and spaced laterally on either side of the longitudinal plane of the aircraft containing the rotor axis; control elements in the form of rods connected to the laterally spaced connections of the holder and depending downwardly; and control means connected to the lower ends of the control elements; the control means comprising a transverse bar pivotally connected to the lower ends of the rods, the transverse bar being mounted for pivotal displacement about a longitudinal axis relative to the air frame and for upward and downward displacement relative to the air frame, the resilient connections urging downwardly relative to the air frame about the universal joint connection that part of the holder supporting the rotor, and thereby permitting tilting of the rotor axis in all directions about the universal joint connection relative to the air frame.

10. A rotary wing aircraft according to claim 9 in which the pivotal displacement of the transverse bar is provided by having a journal fast with it, and having its axis disposed longitudinally, and having fast with it an operator's control, and in which a bearing is provided pivotally supporting the journal about its axis, the bearing being pivotally mounted relative to the air frame about a transverse axis, to provide the upward and downward displacement of the transverse bar relative to the air frame.

11. A rotary wing aircraft having a rotor and an air frame, and which includes a holder below the rotor and supporting the rotor rotatably about an upwardly directed axis; a universal joint connection below the rotor and in front of the rotor axis and connecting the air frame to the holder, the universal joint connection being in the form of gimbal system comprising a bracket pivotally mounted relative to the holder and forward of it about a roll axis which is disposed longitudinally of the aircraft, and a pivotal connection connecting the bracket pivotally to the air frame about a pitch axis transverse to the roll axis; adjustment means for adjusting the spacing between the pitch axis and the rotor axis; and at least two resilient connections between the holder and air frame and spaced laterally on either side of the longitudinal plane of the aircraft containing the rotor axis; the resilient connections urging downwardly relative to the air frame about the universal joint connection that part of the holder supporting the rotor and thereby permitting tilting of the rotor axis in all directions about the universal joint connection relative to the air frame.

12. A rotary wing aircraft according to claim 11, in which pivotal mounting of the bracket about the roll axis is on a main support arm fast with the holder and projecting forwardly from it, and in which the adjustment means includes an externally threaded sleeve rotatably mounted and axially located upon the main support arm, the bracket supporting a pitch spindle below the main support arm, the pitch spindle axis being co-axial with the pitch axis, the bracket having a screw-threaded bore engageable by the externally threaded sleeve, and turning means for turning the said sleeve to rotate about its axis; whereby adjustment in the spacing between the pitch axis and the rotor axis is obtainable by turning the said sleeve in the required direction thereby causing displacement of the bracket.

13. A rotary wing aircraft according to claim 12 in which there is provided further adjustment means for adjusting the spacing of the rotor wing above the universal joint connection.

14. A rotary wing aircraft according to claim 13 in which the further adjustment means are provided by providing the holder with a screw-threaded bore, and in which the further adjustment means includes a bearing box screw-threaded externally and adapted to engage with the screw-threaded bore, turning means to screw the bearing box relative to the screw-threaded bore, there being provided a rotor axle coaxial with the bearing box and rotatably mounted and axially located therein on anti-friction thrust bearings.

References Cited by the Examiner
UNITED STATES PATENTS

| 2,380,581 | 7/1945 | Prewitt | 170—160.26 |
| 2,738,844 | 3/1956 | Nagler | 170—160.27 |
| 2,861,641 | 11/1958 | Bensen | 170—160.27 |
| 3,045,950 | 7/1962 | Jennings | 170—160.1 |

FOREIGN PATENTS

| 934,542 | 1/1948 | France. |
| 662,752 | 12/1951 | Great Britain. |

SAMUEL LEVINE, *Primary Examiner.*

JULIUS E. WEST, *Examiner.*